United States Patent [19]

Seibert et al.

[11] Patent Number: 4,776,420
[45] Date of Patent: Oct. 11, 1988

[54] DEVICE FOR AUTOMOTIVE VEHICLES WITH TRACTION CONTROL AND CRUISE CONTROL

[75] Inventors: Wolfram Seibert, Pfungstadt; Norbert Ocvirk, Offenbach am Main; Joachim Maas, Darmstadt, all of Fed. Rep. of Germany

[73] Assignee: Alfred Teves GmbH, Frankfurt am Main, Fed. Rep. of Germany

[21] Appl. No.: 25,953

[22] Filed: Mar. 16, 1987

[30] Foreign Application Priority Data

Mar. 15, 1986 [DE] Fed. Rep. of Germany ....... 3608790

[51] Int. Cl.$^4$ .............................................. B60K 31/02
[52] U.S. Cl. ..................................... 180/178; 180/197
[58] Field of Search ............... 180/174, 175, 176, 177, 180/178, 179, 197; 123/349, 350; 303/100, 102, 103, 111

[56] References Cited

U.S. PATENT DOCUMENTS 3,844,371 10/1974 Garcea ................................ 180/197

Primary Examiner—John J. Love
Assistant Examiner—Richard Camby
Attorney, Agent, or Firm—James B. Raden; Robert P. Seitter

[57] ABSTRACT

A device for automotive vehicles for both traction control and cruise control is equipped with a common servo motor (13) which, by way of a self-locking gear (14), by way of a switchable friction gear (17) and by way of a linkage (23, 24; 25, 26) acts upon a transmission device interposed into the path of force transmission from an accelerator pedal (1) to the throttle-flap (2) of an internal-combustion engine or to the adjusting lever of the injection pump of a spark-ignition engine. Depending on the switch position of the friction gear (17), the servo motor (13) permits control of either the traction (VR) or the speed (GR). During traction control, a release of the accelerator pedal (1) leads at any time to closing of the throttle-flap (2), while an increase of the pedal force does not have any effect on the position of the throttle-flap. After the activation of cruise control, it is still possible to increase the engine power by further depressing the accelerator pedal (1).

8 Claims, 1 Drawing Sheet

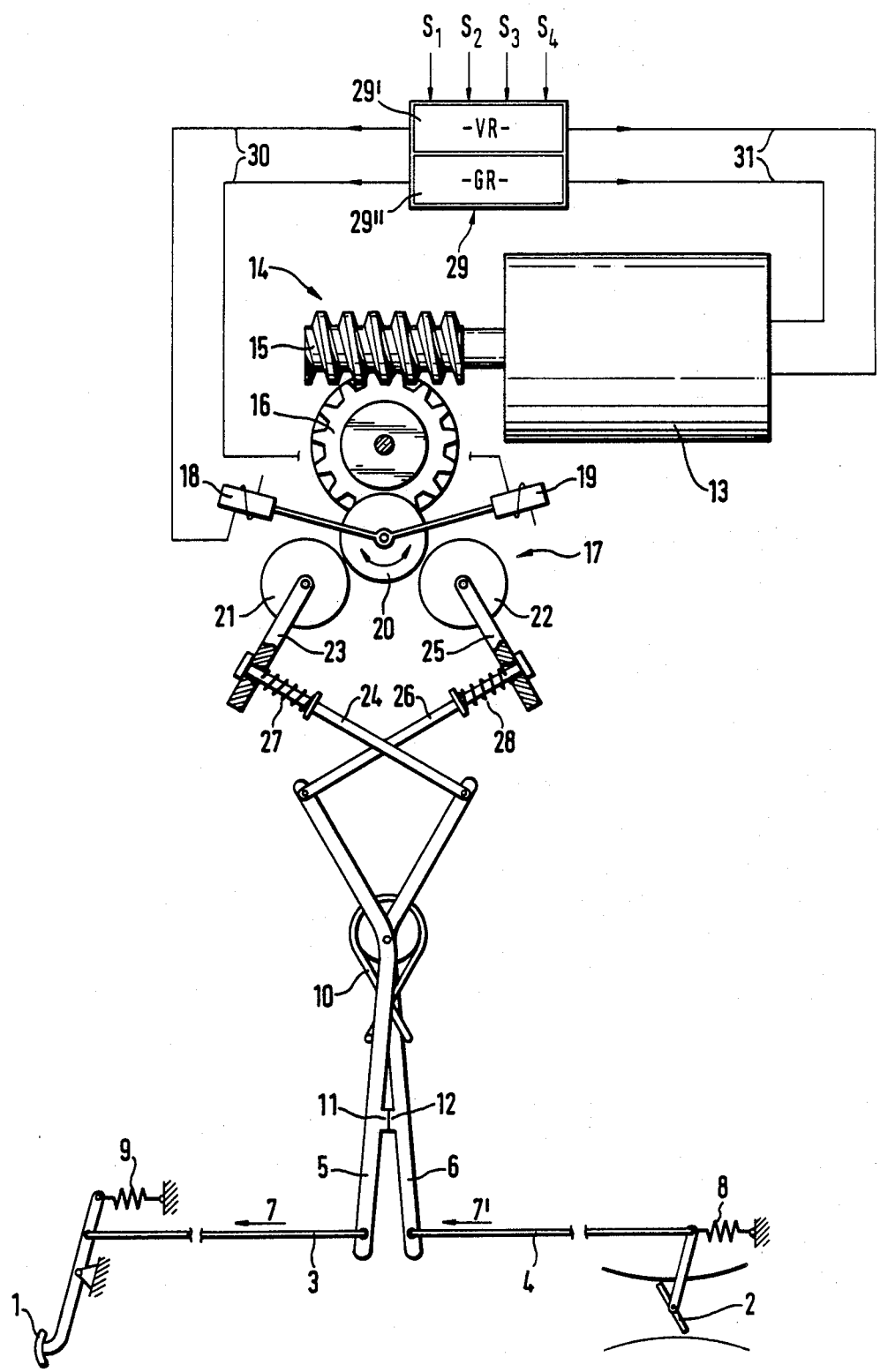

DEVICE FOR AUTOMOTIVE VEHICLES WITH TRACTION CONTROL AND CRUISE CONTROL

BACKGROUND OF THE INVENTION

The present invention relates to a transmission device for automotive vehicles with traction control and cruise control. The transmission device is interposed into the path of force transmission from a drive control pedal, such as an accelerator pedal or a corresponding control lever, to a control member of the vehicle driving engine. The control member can be the throttle-flap of an internal-combustion engine, or the adjusting lever of the injection pump of a spark-ignition engine, or the like. A traction control unit engages the transmission device.

Traction control systems are known which, in the presence of excessive traction slip, intervene into the path of force transmission from the accelerator pedal to the control member of the driving engine. That is, the throttle-flap or the injection pump adjusting lever, and which reduce the drive power of the engine. As soon as the coefficient of adherence between tire and road is sufficient again, the drive power is increased again by virtue of this control. German published patent application Nos. 30 21 116 and 33 37 664 describe such systems, wherein the auxiliary energy which resets the throttle-flap or the adjusting lever in opposition to the actuating force exerted on the accelerator pedal is generated in the form of hydraulic energy. It is likewise known to use electric motors for the generation of the resetting torques. The provision of control devices for maintaining the preselected speed of an automotive vehicle constant is also known. To this end, electric servo motors can be used for instance which, instead of the accelerator pedal, adjust the throttle-flap or the injection pump of the driving engine.

It is advisable to equip vehicles with systems for traction control and systems for cruise control which are independent of one another. This necessitates substantial expenditure. As both systems may generate contradicting commands, provisions must be made to prevent interferences caused thereby such as permanent switch-over and the like.

It is an object of the present invention to develop a device which is structurally simple and can be manufactured with comparatively little effort, and which lends itself to being used for traction control as well as for cruise control. A disengagement of both types of control is ensured in order to avoid the above-mentioned shortcomings.

SUMMARY OF THE INVENTION

This object is achieved in a simple and technically advanced manner by a device of the type referred to, the improvement thereof residing in that the transmission device comprises two rotatably supported levers which are coupled by a coupling spring in the pedal actuating direction and by mutual stops in the pedal resetting direction. One of the levers is in engagement with the pedal, while the second lever is engaged with the control member as well as with the traction control unit. Provision is made of one joint servo motor for traction control and for cruise control, which motor is adapted to be couple, by way of a self-locking gear, by way of a switchable friction gear or by way of coupling members. These coupling members may include linkages or Bowden cables, either with the lever engaged with the pedal or with the second lever. The servo motor and/or the friction gear is controllable and switchable, respectively, as a function of the rotational behavior of the driven wheels.

Hence, it follows that the present invention provides either control of the traction or to keeping the vehicle speed constant with the aid of one common servo motor which, depending on the switch position of the pertinent friction gear, is in engagement with the pedal-side lever or with the de-coupling lever of the force-transmission device. It is thereby ensured that, during traction control, an increase of the pedal force will not have any effect on the position of the throttle-flap or the adjusting lever, respectively, while a reduction of the force applied on the accelerator pedal will be transmitted onto the control member in every phase of control. Moreover, it is ensured that the vehicle can be accelerated at any time during cruise control by increasing the pedal force.

By means of simple electromagnets, the friction gear of the inventive device can be brought into engagement with traction control or with cruise control or can be brought to assume an idle-run switch position in a simple manner.

BRIEF DESCRIPTION OF THE DRAWING

Further features, advantages and applications of the instant invention can be gathered from the following description of an embodiment with reference to the accompanying drawing wherein the single FIGURE illustrates in a schematic, simplified and partially symbolic view the essential components of an inventive device for traction control and cruise control.

DETAILED DESCRIPTION

Referring to the drawing, a pedal-force transmission device is interposed between a drive control pedal 1, which is conventionally an accelerator pedal, and the control member of an automotive vehicle driving engine, for instance a throttle-flap 2. In the instant case, the transmission device includes two pull rods or Bowden cables 3, 4 and of two rotatably supported levers 5, 6. Lever 5 is coupled directly to the accelerator pedal 1 by way of the rod or the Bowden cable 3, while the so-called de-coupling lever 6 is in engagement with the throttle-flap 2 by way of the cable or rod 4.

When the pedal 1 is actuated, a tensile force is transmitted in the direction of the arrows 7, 7' onto the throttle-flap 2. When the pedal 1 is relieved from load, the throttle-flap 2 is turned back by a resetting spring 8 to assume its inactive position shown, the closed position. A resetting spring 9 also engages at the accelerator pedal 1.

In the pedal actuating direction, which is symbolized by the arrows 7, 7', the two levers 5, 6 are biased by a coupling spring 10, herein a leg spring, while in the opposite direction two mutual stops 11, 12 transmit resetting forces.

An electric motor whose direction of rotation is reversible serves as a servo motor 13 both in traction control VR and in cruise control GR. A like servo motor 13 can readily be realized by a direct-current motor, the direction of rotation of which can be reversed by changing the polarity of the supply voltage. Seated on the output shaft of the servo motor 13 is a self-locking gear 14, which comprises a worm gear 15 driving a toothed wheel 16 in the embodiment herein illustrated. With the aid of a switchable friction gear 17, the rotary movement of the toothed wheel 16 is transmitted by a coupling wheel 20 tiltable by attracting magnets 18, 19 either onto a friction wheel 21 or a second friction wheel 22. The connection between the friction wheels 21 and 22 and the de-coupling lever 6 of the transmission device or, respectively the pedal-side lever 5 is performed in each case by a linkage 23, 24 and 25, 26, respectively. The two arms 23, 24 and 25, 26, respectively, of the linkage are in each case in engagement with one another such that only tensile forces are allowed to be transmitted. De-coupling springs 27, 28 will re-establish the illustrated relative position of the arms 23, 24 and 25, 26, respectively, after load is applied on the linkage in the opposite direction, that means in compression.

The servo motor 13 and the operating magnets 18, 19 of the friction gear 17 are controlled by electric signals which are generated in an electronic controller 29 (29, 29') and are transmitted by way of signal lines 30, 31. This controller 29 comprises hard-wired or programmed electronic circuits VR, GR enabling to derive the required traction and speed control signals from the rotational behavior of the driven wheels. To this end, the controller is supplied with electric signals containing the information about the wheel-rotational behavior by way of the signal inputs $S_1$, $S_2$ which are symbolized by arrows. For example, such signals can be obtained by virtue of inductive wheel sensors of known design. By way of further signal inputs $S_3$, $S_4$, switches or switching devices can be connected, for example, which serve to activate traction control VR or cruise control GR.

The electronic circuits for traction control and for cruise control VR and GR can be separated or as is indicated herein by the dot-dash line of separation between the traction control and the cruise control 29', 29'', can be realized by one common circuitry.

The operation of the described embodiment of the inventive device is as follows: As long as neither traction control nor cruise control are in operation, every movement of the accelerator pedal 1 is transmitted directly onto the throttle-flap 2 in opposition to the force of the resetting springs 8 and 9. The two levers 5, 6 remain in abutment. The path of force transmission in the actuating and resetting direction is closed through the de-coupling spring 10.

When traction slip is signalled by the wheel sensors which are connected to the inputs $S_1$, $S_2$ of the controller 29, the controller 29 starts to function. The electromagnet 18 attracts the switching friction wheel, (i.e., the coupling wheel 20) so that now the servo motor 13 moves into engagement with the de-coupling lever 6 by way of the self-locking worm gear 14, by way of the friction gear 17 and by way of the linkage 23, 24. A rotation of the friction wheel 21 clockwise (as viewed in the drawing) takes effect as a tensile force on the arm 24 of the linkage and, by way of the lever 6 as well as by way of the Bowden cable 4, results in a resetting of the throttle-flap 2 and hence in a reduction of the drive power of the vehicle engine. Caused by the twisting of the lever 6, the stops 11, 12 will move at a distance. Because of the increased load on the de-coupling spring 10, the driver senses a little increase of the pedal resetting force. When the driver depresses the accelerator pedal 1 further, only the de-coupling spring 10 will be loaded more. The position of the throttle-flap 2 reset by the traction control VR will not be changed thereby. In contrast thereto, release of the accelerator pedal 1, that is a reduction of the pedal force, will be transmitted onto the throttle-flap 2 as soon as the mutual stops 11, 12 are in contact again, because the arm 24 of the linkage 23, 24 (which arm transmits the adjusting force of the servo motor 13 controlling the traction) can be subjected to tensile load only. In the opposite direction, the arm 24 is slid through the indicated bore in the arm 23 of the linkage 24 in opposition to the small resistance of the de-coupling or resetting spring 27.

The activation of cruise control GR via the circuit 29'' of the controller 29 results in response of the attracting magnet 19 and, thereby, in coupling of the servo motor 13 with the pedal-side lever 5 by way of the worm gear 14 and the switchable friction gear 17 and by way of the linkage 25, 26. Also, in this case, only tensile force is transmitted by way of the linkage 25, 26 whereby it is achieved that, even during the operation of cruise control GR, the driver is able to re-adjust the throttle-flap 2 at any time by means of the accelerator pedal 1 in the direction of attaining a higher engine power. Consequently, the accelerator pedal actuation has priority over cruise control in order to enable the driver to increase the vehicle speed in excess of the adjusted constant speed in the event of a passing action or in emergency situations.

What is claimed:

1. A device for automotive vehicles having driven wheels with traction control and cruise control, comprising a transmission device interposed into the path of force transmission from a drive control pedal to a control member of the vehicle driving engine, which control member includes the throttle of the engine, which transmission device is engaged by a traction control unit, wherein the transmission device comprises two rotatably supported levers (5, 6) which are coupled by a coupling spring (10) in the pedal actuating direction and further coupled by mutual stops (11, 12) in the pedal resetting direction, one lever (5) thereof being in engagement with the pedal (1), while the second lever (6) engages with the control member (2) and engages with the traction control unit, wherein a joint servo motor (13) is provided for traction control and for cruise control, which motor is alternately coupled for traction control or cruise control, by way of a self-locking gear (14), a switchable friction gear (17), and coupling linkages (23, 24; 25, 26), with the lever (5) engaged with the pedal and the second lever (6) engaged with the control member, said servo motor (13) and said friction gear (17) being controllable and switchable into operative engagement as a function or the rotational behavior of the driven wheels.

2. A device as claimed in claim 1, wherein the self-locking gear (14) a worm gear which engages a toothed wheel.

3. A devie as claimed in claim 1, wherein the friction gear (17) is alternately switchable into operative engagement with one of said supported levers (5, 6) by means of a pair of separately actuable electromagnets (18, 19).

4. A device as claimed in claim 1, wherein the friction gear (17) is switchable to an intermediate idle-run position.

5. A device as claimed in claim 1, wherein said supported levers (5, 6) of the transmission device are coupled to the friction gear (17) each by way of a separate linkage (23, 24; 25, 26) which, depending on its arrangement, transmits one of (i) only push or (ii) only pull in said path of force transmission and provides rotation of the levers (5, 6) in opposite directions.

6. A device as claimed in claim 5, wherein in the path of force transmission of the linkages (23, 24; 25, 26) interconnecting the friction gear (17) with the levers (5, 6), de-coupling springs (27, 28) are inserted which provide a resetting force when the levers (5, 6) are rotated in opposite directions.

7. A device as claimed in claim 6, wherein the servo motor (13) and the friction gear (17) are controllable and switchable, respectively, by electronic signals which are derived from the rotational behavior of the driven wheels by means of electronic circits (VR; GR).

8. A device as claimed in claim 1, including hand-operated switches for connecting the friction gear (17) to the (i) traction control (VR) and the (ii) cruise control (GR).

* * * * *